US009281856B2

(12) United States Patent  (10) Patent No.: US 9,281,856 B2
Yeh et al.  (45) Date of Patent: Mar. 8, 2016

(54) SUPPORT BASE FOR ELECTRONIC DEVICE

(71) Applicant: Wistron Corp., New Taipei (TW)

(72) Inventors: Ping-Sheng Yeh, New Taipei (TW);
Cheng-Tang Chang, New Taipei (TW);
Shin-Yi Hsieh, New Taipei (TW);
Chia-Sheng Lin, New Taipei (TW)

(73) Assignee: WISTRON CORP., New Taipei (TW)

(*) Notice: Subject to any disclaimer, the term of this patent is extended or adjusted under 35 U.S.C. 154(b) by 156 days.

(21) Appl. No.: 14/284,131

(22) Filed: May 21, 2014

(65) Prior Publication Data
US 2015/0214989 A1  Jul. 30, 2015

(30) Foreign Application Priority Data
Jan. 29, 2014 (TW) .............................. 103103510 A

(51) Int. Cl.
H04M 1/00  (2006.01)
H04B 1/3877  (2015.01)
(52) U.S. Cl.
CPC .................................... *H04B 1/3877* (2013.01)
(58) Field of Classification Search
CPC ................................................... H04B 1/3877
USPC .................. 455/575.1; 379/455; 340/815.83; 361/679.27; 248/287.1, 122.1, 316.4
See application file for complete search history.

(56) References Cited

U.S. PATENT DOCUMENTS

| 2006/0215836 A1* | 9/2006 | Wang | H04M 1/04 379/455 |
| 2007/0284500 A1* | 12/2007 | Fan | B60R 11/02 248/346.06 |
| 2012/0098492 A1* | 4/2012 | Sulem | H01R 24/28 320/111 |
| 2012/0154996 A1* | 6/2012 | Yang | H04M 1/0216 361/679.01 |
| 2014/0191034 A1* | 7/2014 | Glanzer | G06K 7/082 235/449 |

* cited by examiner

Primary Examiner — David Q Nguyen
(74) Attorney, Agent, or Firm — Maschoff Brennan

(57) ABSTRACT

A support base for an electronic device includes a base, a trigger mechanism and an operating mechanism. The base includes a limit rib. The trigger mechanism includes a trigger member and a swing member. The trigger member is movably disposed on the base and therefore has an untriggered position and a triggered position. The swing member is pivoted on the trigger member and therefore has a pressed position and a room-making position. The operating mechanism is movably disposed on the base and therefore has a first operating position and a second operating position. The operating mechanism has an operating end and a moving end opposite to each other. The moving end corresponds to the swing member and is used for rotating relative to the operating end. When the operating mechanism is at the first operating position, the moving end of the operating mechanism is hooked at the limit rib.

16 Claims, 16 Drawing Sheets

SUPPORT BASE FOR ELECTRONIC DEVICE

CROSS-REFERENCE TO RELATED APPLICATIONS

This non-provisional application claims priority under 35 U.S.C. §119(a) on Patent Application No(s). 103103510 filed in Taiwan, R.O.C. on 2014 Jan. 29, the entire contents of which are hereby incorporated by reference.

TECHNICAL FIELD

The disclosure relates to a support base, more particularly to a support base for an electronic device.

BACKGROUND

Tablet computers can be used to surf the internet, and to watch the video, pictures, e-books, etc. In addition, tablet computers are compact, light and easy to use so users can use them on a desk and can carry them to other places with ease.

Certainly the tablet computers are much better than the desktops in terms of mobility, but the desktops may outperform the tablet computers when both are using on a desk. For instance, the desktop has a stand for supporting it so it can be erected on a desk. The tablet computer, however, requires a user to hold it by hand when using it on the desk. In other words, the excellent mobility of the tablet computer somewhat hinder the usage of the tablet computer on the desk. As a result, support bases or expand bases were introduced for addressing this problem. Nonetheless, these accessories are not well designed because currently the users still need to assemble or disassemble the tablet computer on these accessories with two hands, which is inconvenient. Hence, it is crucial to improve the operating convenience of the support base for the tablet computer.

SUMMARY

A support base for an electronic device comprises a base, a trigger mechanism and an operating mechanism. The base comprises a limit rib. The trigger mechanism comprises a trigger member and a swing member. The trigger member is movably disposed on the base and therefore has an untriggered position and a triggered position. The swing member is pivoted on the trigger member and therefore has a pressed position and a room-making position. The operating mechanism is movably disposed on the base and therefore has a first operating position and a second operating position. The operating mechanism has a operating end and a moving end opposite to each other. The moving end corresponds to the swing member and is configured for rotating relative to the operating end. When the operating mechanism is at the first operating position, the moving end of the operating mechanism is hooked at the limit rib. When the operating mechanism is at the second operating position, the moving end of the operating mechanism releases from the limit rib. When the swing member is at the pressed position and the trigger member is moving from the untriggered position to the triggered position, the trigger member drives the swing member to move towards the moving end of the operating mechanism, and the swing member presses the moving end for making the moving end be separated from the limit rib, in order to trigger the operating mechanism moving from the first operating position to the second operating mechanism. When the trigger member is at the triggered position and the operating mechanism is moving from the second operating position to the first operating position, the moving end of the operating mechanism pushes the swing member and therefore drives the swing member to rotate relative to the trigger member for making the swing member rotate from the pressed position to the room-making position, in order to make room for the moving end to hook at the limit rib, thereby making the operating mechanism return to the first operating position.

BRIEF DESCRIPTION OF THE DRAWINGS

The present disclosure will become more fully understood from the detailed description and the drawings given herein below for illustration only, and thus does not limit the present disclosure, wherein.

DETAILED DESCRIPTION

Figure 1:
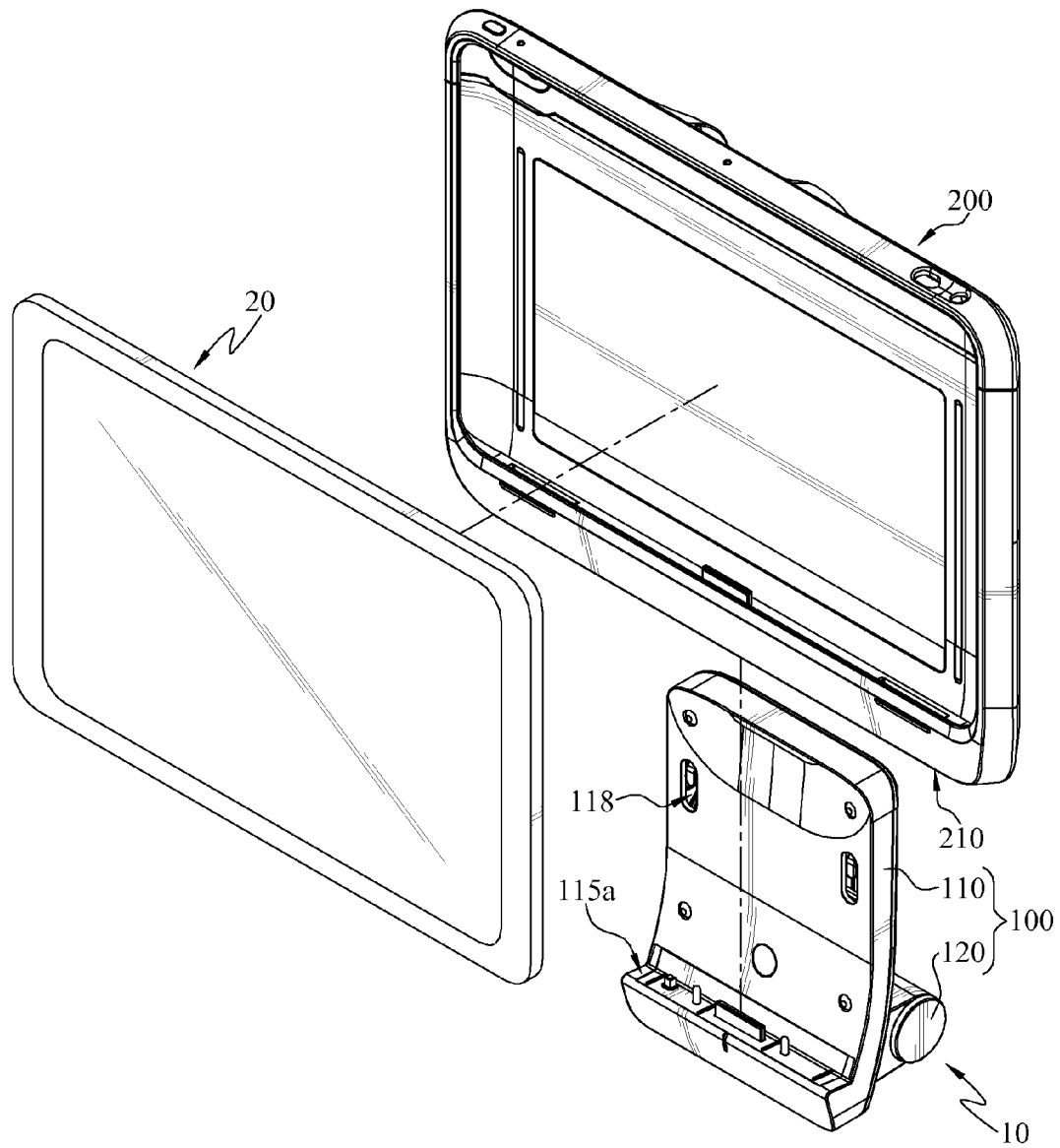
FIG. 1 is a perspective view of an electronic device installed on a support base according to the first embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
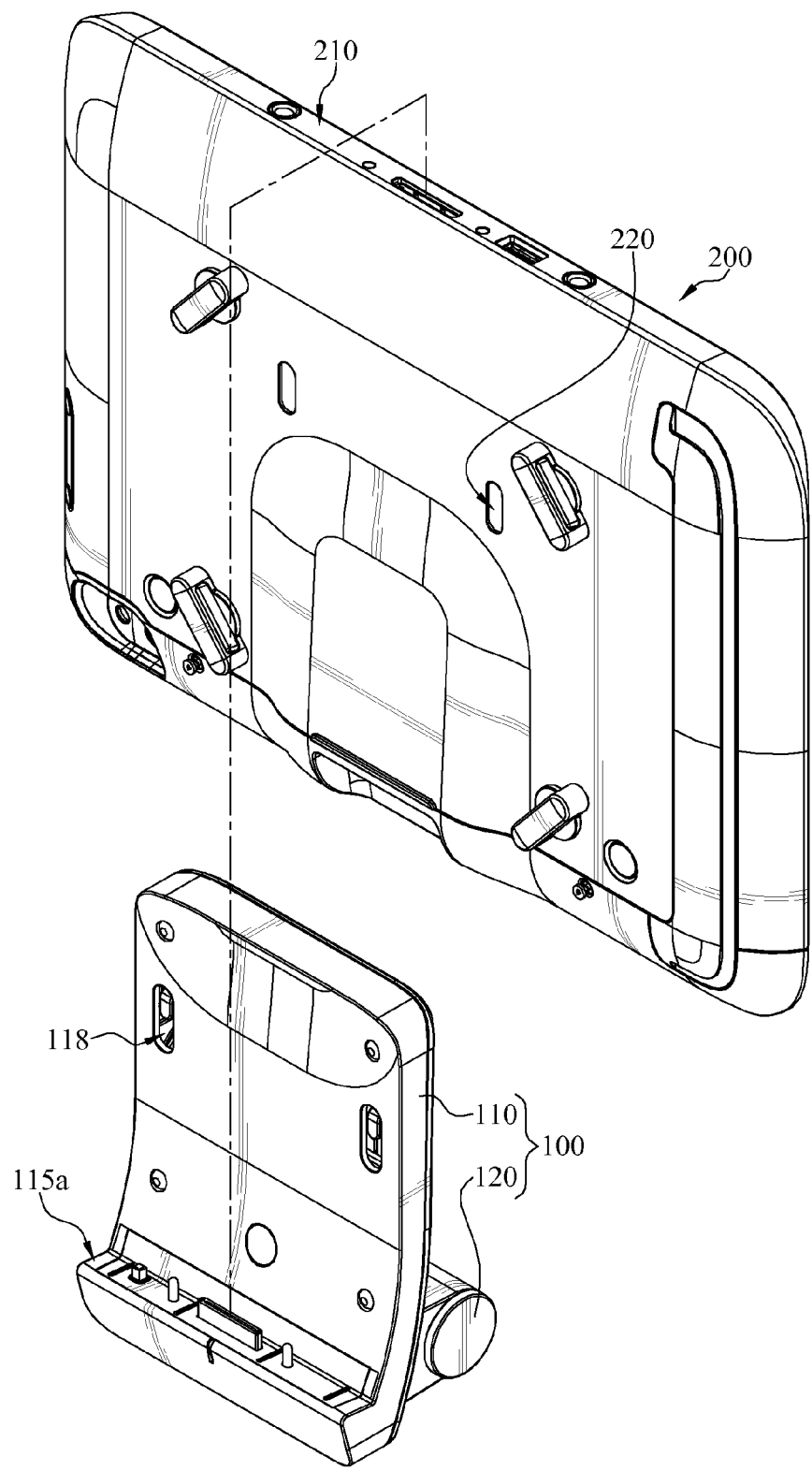
FIG. 2 is an exploded view of the support base of FIG. 1.
Figure 3:
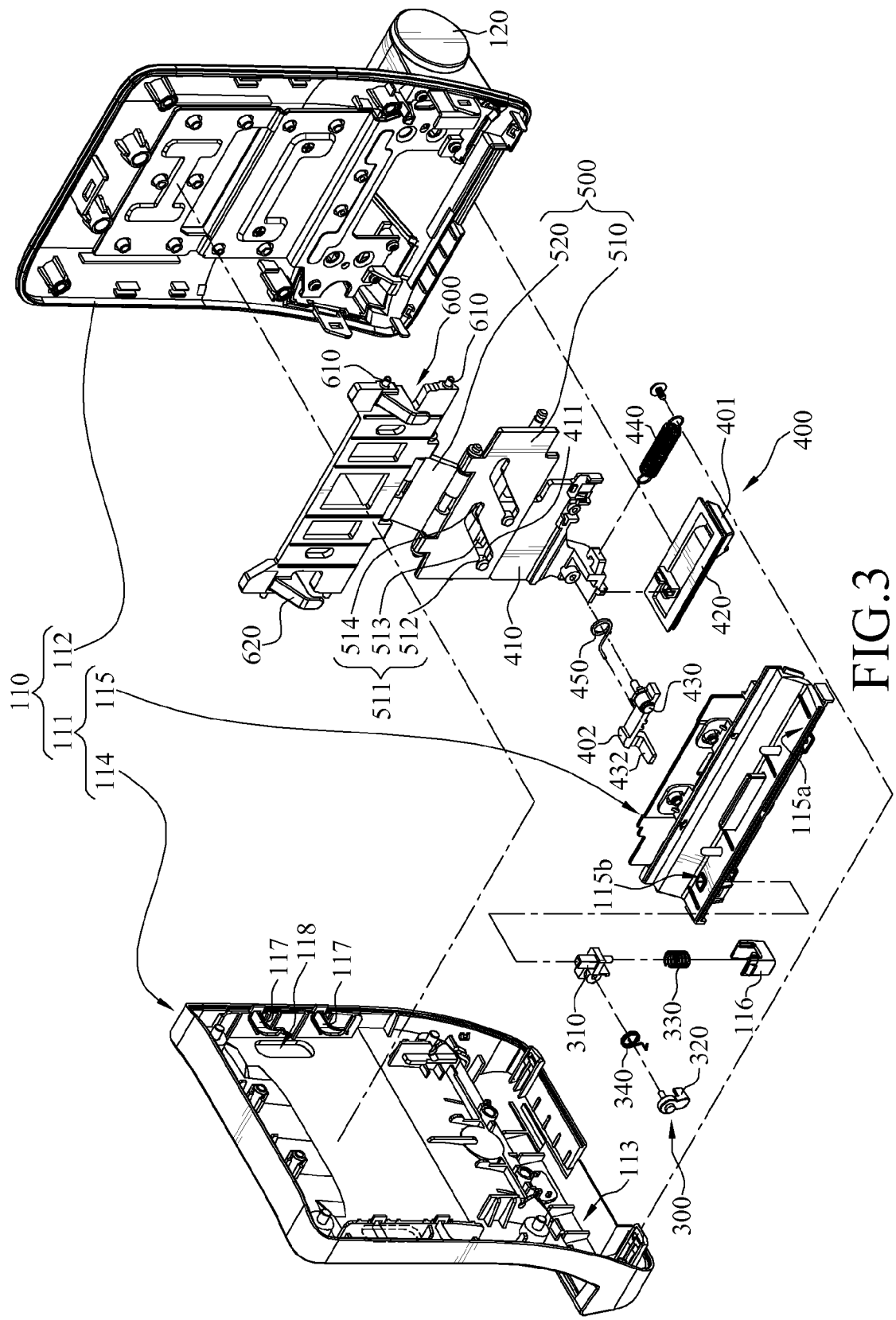
FIG. 3 is a detailed exploded view of the support base of FIG. 2.
Figure 4:
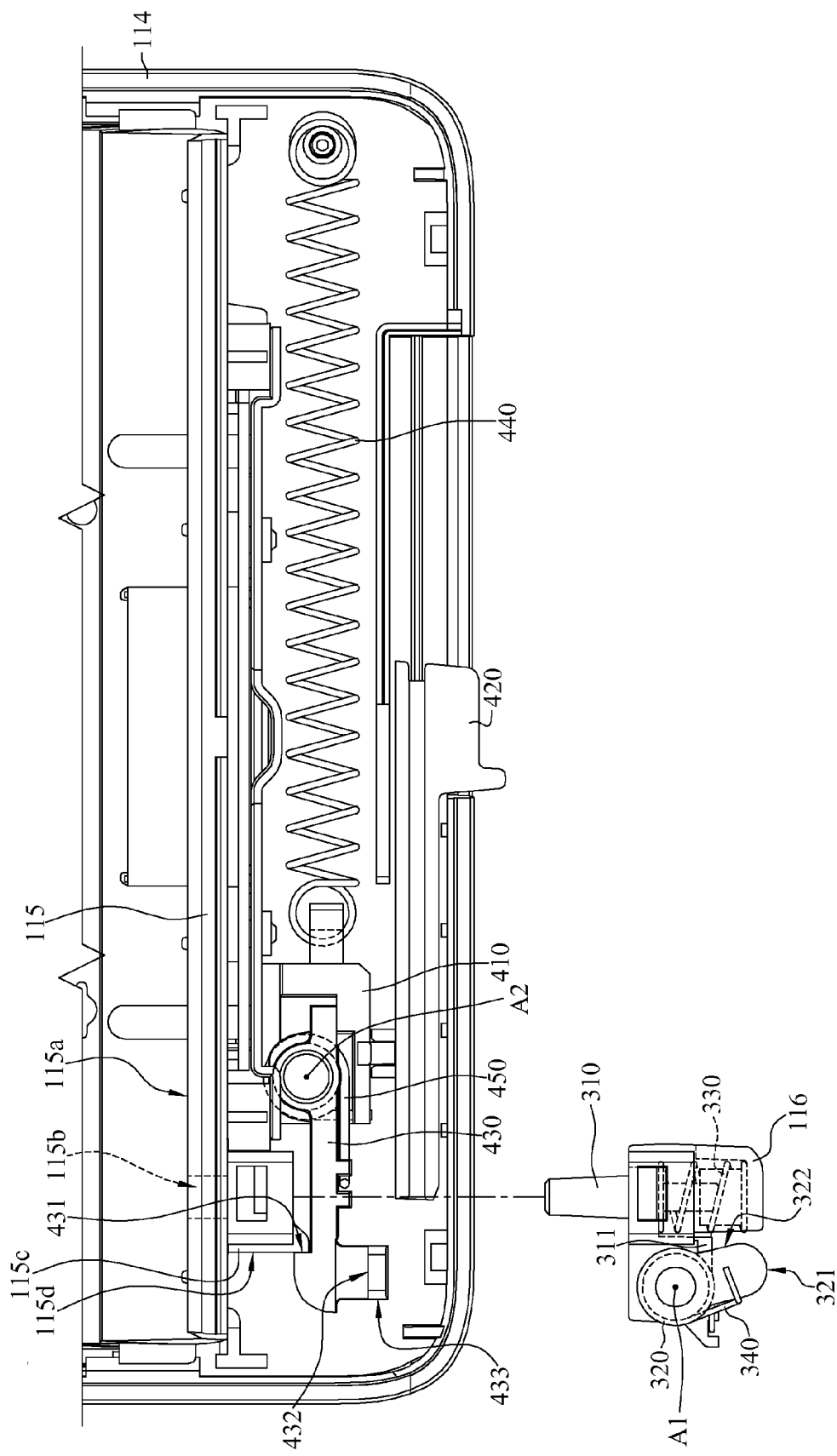
FIG. 4 is a partial side view of FIG. 4.
Figure 5:
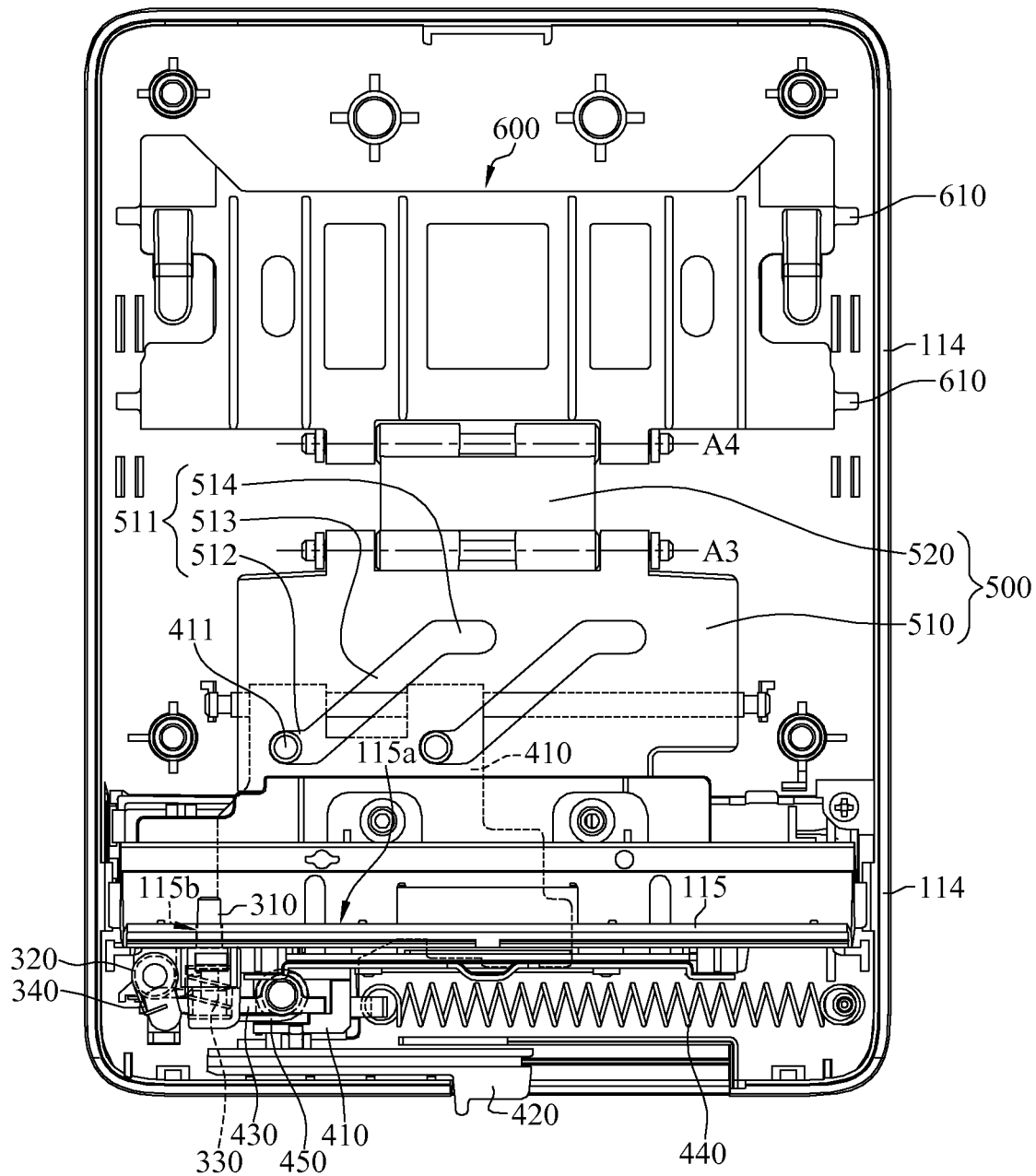
FIG. 5 is a plan view of the base, the trigger mechanism, the operating mechanism and the fastening mechanism assembled together according to FIG. 3.

FIG. 1 is a perspective view of an electronic device installed on a support base according to the first embodiment of the disclosure; FIG. 2 is an exploded view of the support base of FIG. 1; FIG. 3 is a detailed exploded view of the support base of FIG. 2; FIG. 4 is a partial side view of FIG. 4; FIG. 5 is a plan view of the base, the trigger mechanism, the operating mechanism and the fastening mechanism assembled together of FIG. 3. As seen in FIG. 1 to FIG. 5, in this embodiment, the support base 10 of the electronic device 20 comprises a base 100, a combining piece 200, a trigger mechanism 300, an operating mechanism 400, a link mechanism 500 and a fastening mechanism 600.

The base 100 comprises a case 110 and a support member 120. The case 110 comprises a front cover 111 and a back cover 112. The back cover 112 is detachably installed on the front cover 111 and therefore together form an installation space 113. The support member 120 is located outside the installation space 113 and protrudes from the back cover 112. Specifically, the front cover 111 comprises a cover portion 114, a carrying portion 115 and a cap portion 116. The cover portion 114 is installed on the back cover 112. The cover portion 114 has a plurality of curved sliding grooves 117 and a plurality of through holes 118. These the curved sliding grooves 117 are located on opposite two sides of the cover portion 114 symmetrically. The carrying portion 115 is installed on the cover portion 114 and has a carrying surface 115a and an opening 115b. The carrying surface 115a is out of the installation space 113 while the opening 115b is located on the carrying surface 115a and connects the installation space 113. The cap portion 116 is installed in the installation space 113 and is located on one side of the carrying portion 115 facing away from the carrying surface 115a. Additionally, the carrying portion 115 comprises a limit rib 115c located in the installation space 113 and protruding from one side of the carrying portion 115 facing away from the carrying surface 115a. The limit rib 115c has a first limit side the first limit surface 115d perpendicular to the carrying surface 115a The combining piece 200 is configured for sleeving on an electronic device 20. The combining piece 200 has a bottom surface 210 and a plurality of combining piece 200. The first fastening portion 220 is a hooking groove, for example. When the combining piece 200 is installed on the base 100 (as shown in FIG. 1), the bottom surface 210 of the combining piece 200 touches the carrying surface 115a and each of the combining piece 200 corresponds to each of the through holes 118 on the cover portion 114 respectively.

Figure 6:
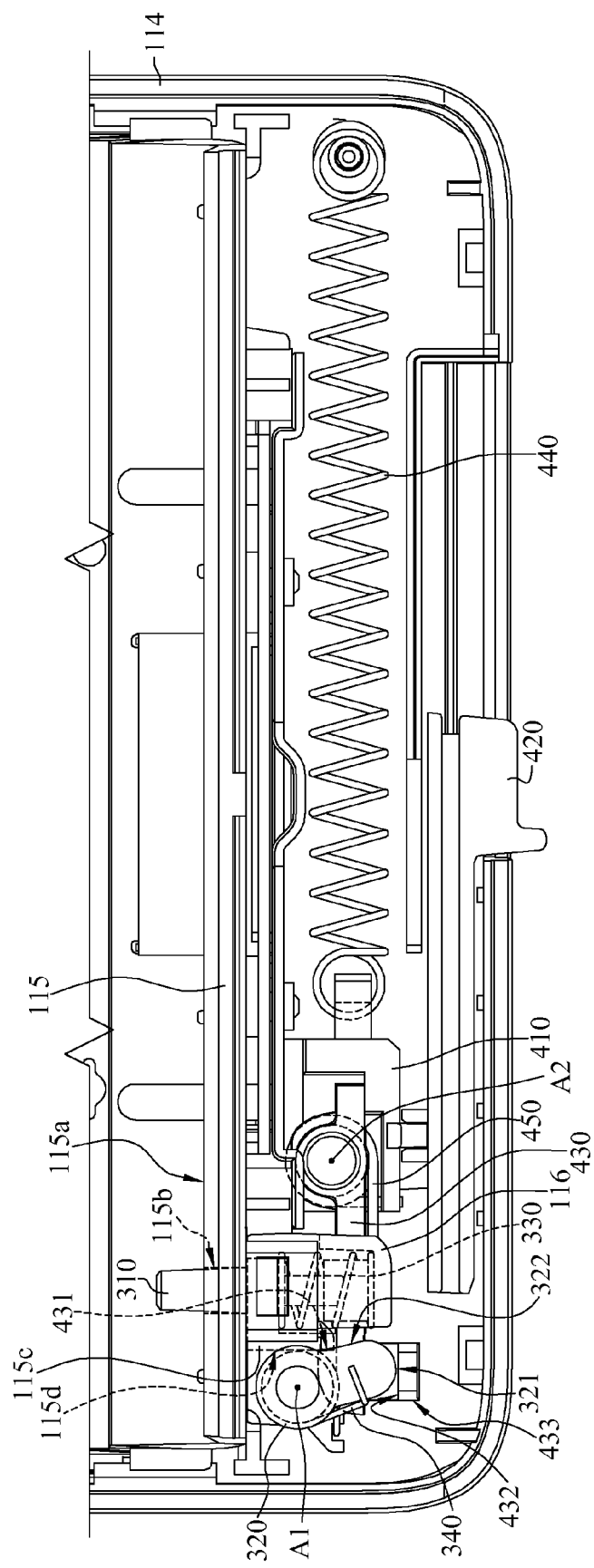
FIG. 6 is a plan view of the trigger member at the untriggered position of FIG. 5.
Figure 7A:
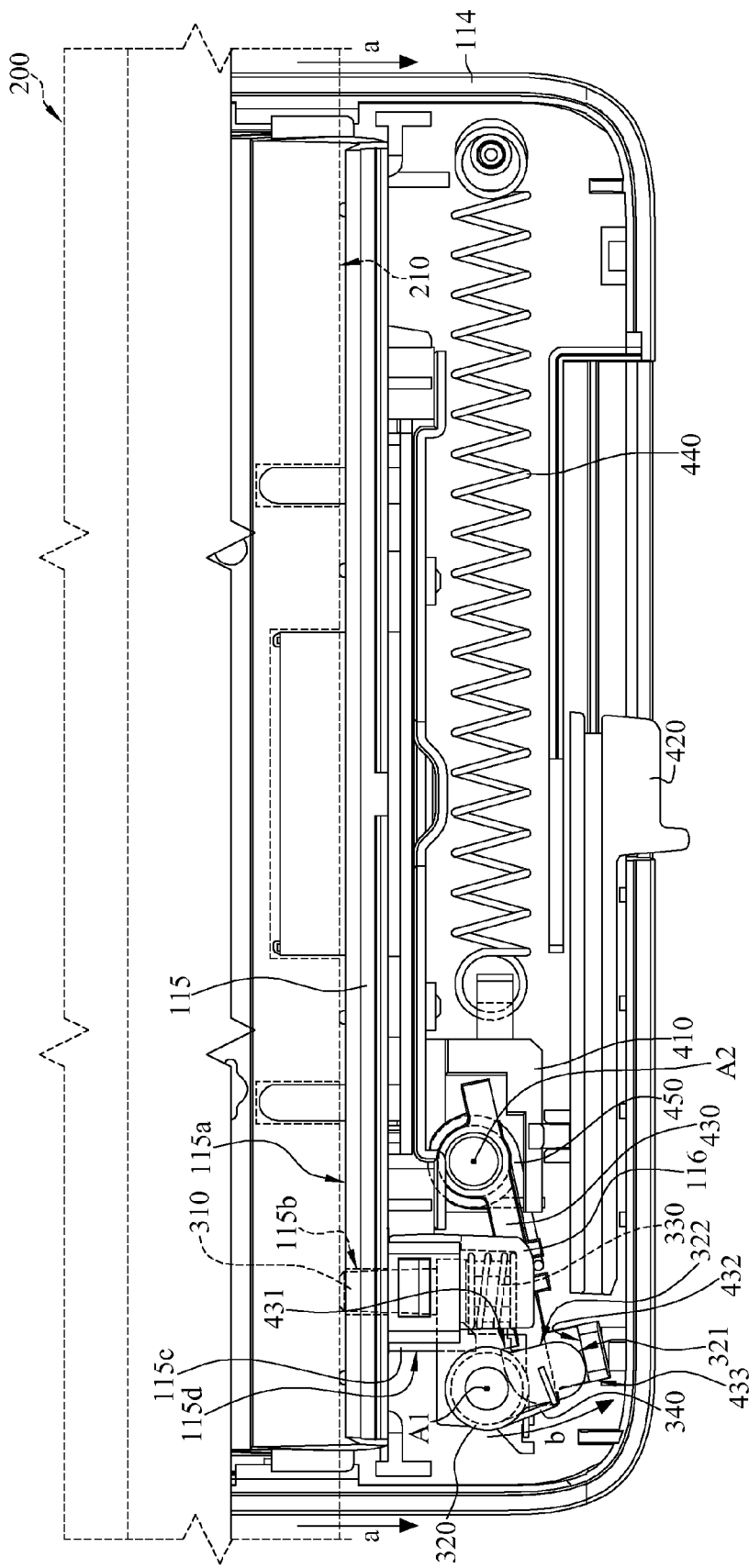
FIG. 7A to FIG. 7C are plan views of the trigger member at the triggered position and the operating mechanism at the first operating position of FIG. 5.
Figure 7B:
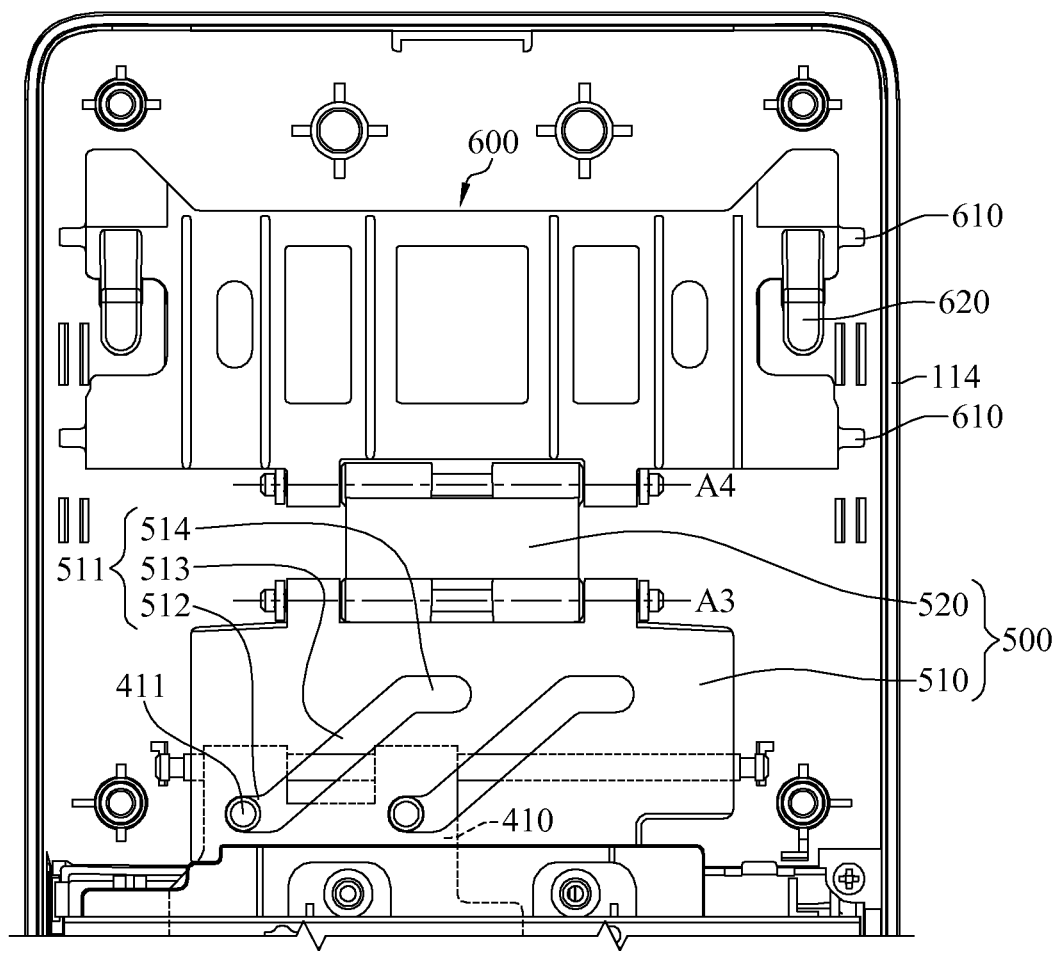
Figure 7C:
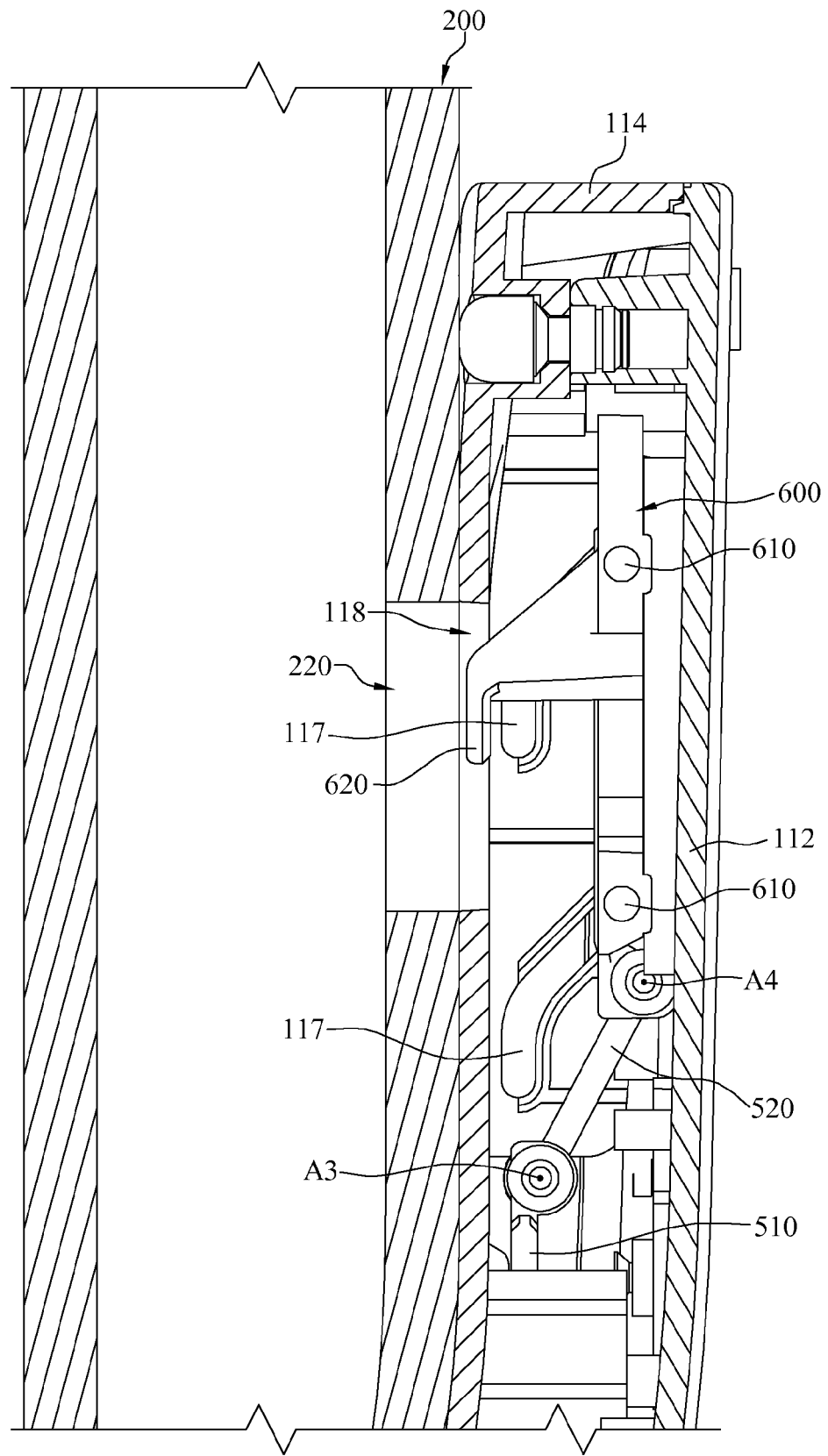
Figure 8A:
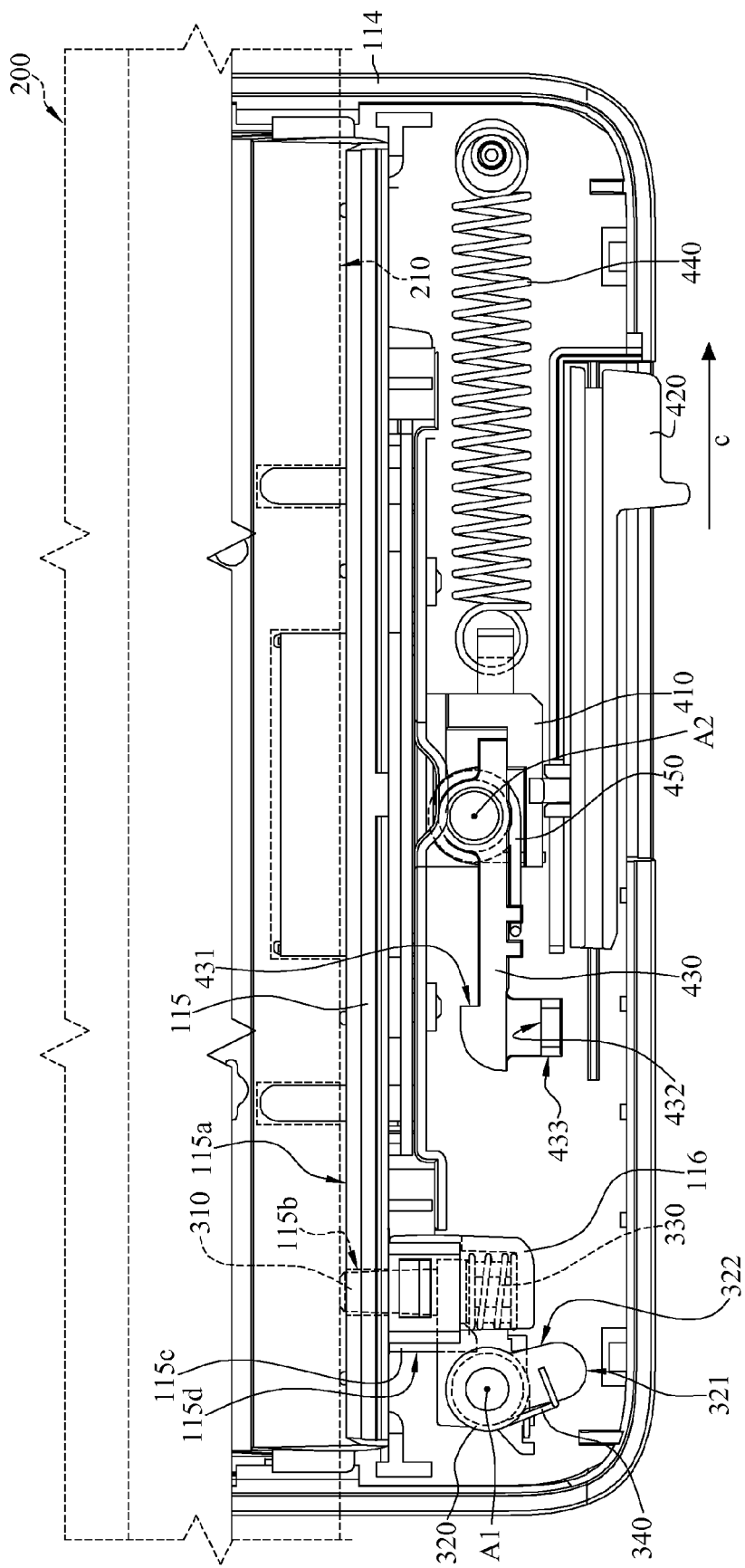
FIG. 8A to FIG. 8C are plan views of the trigger member at the triggered position and the operating mechanism at the second operating position of FIG. 5.
Figure 8B:
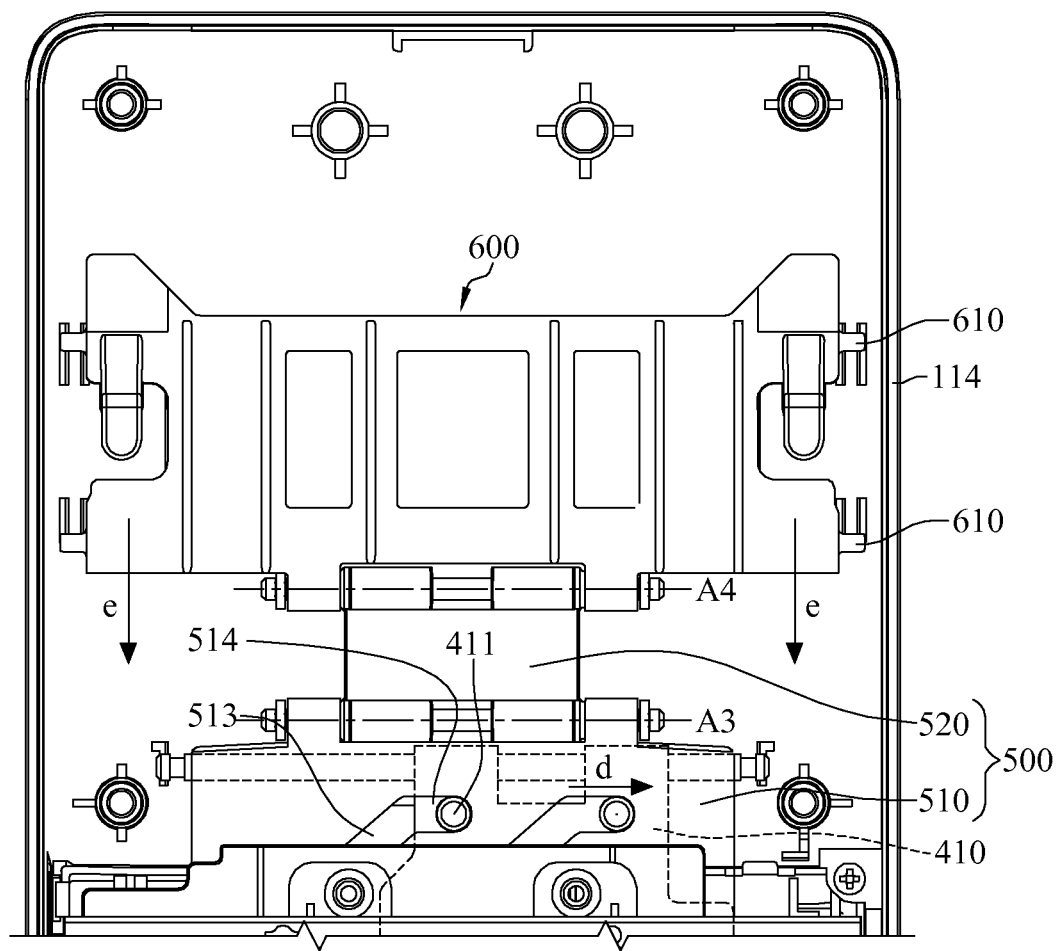
Figure 8C:
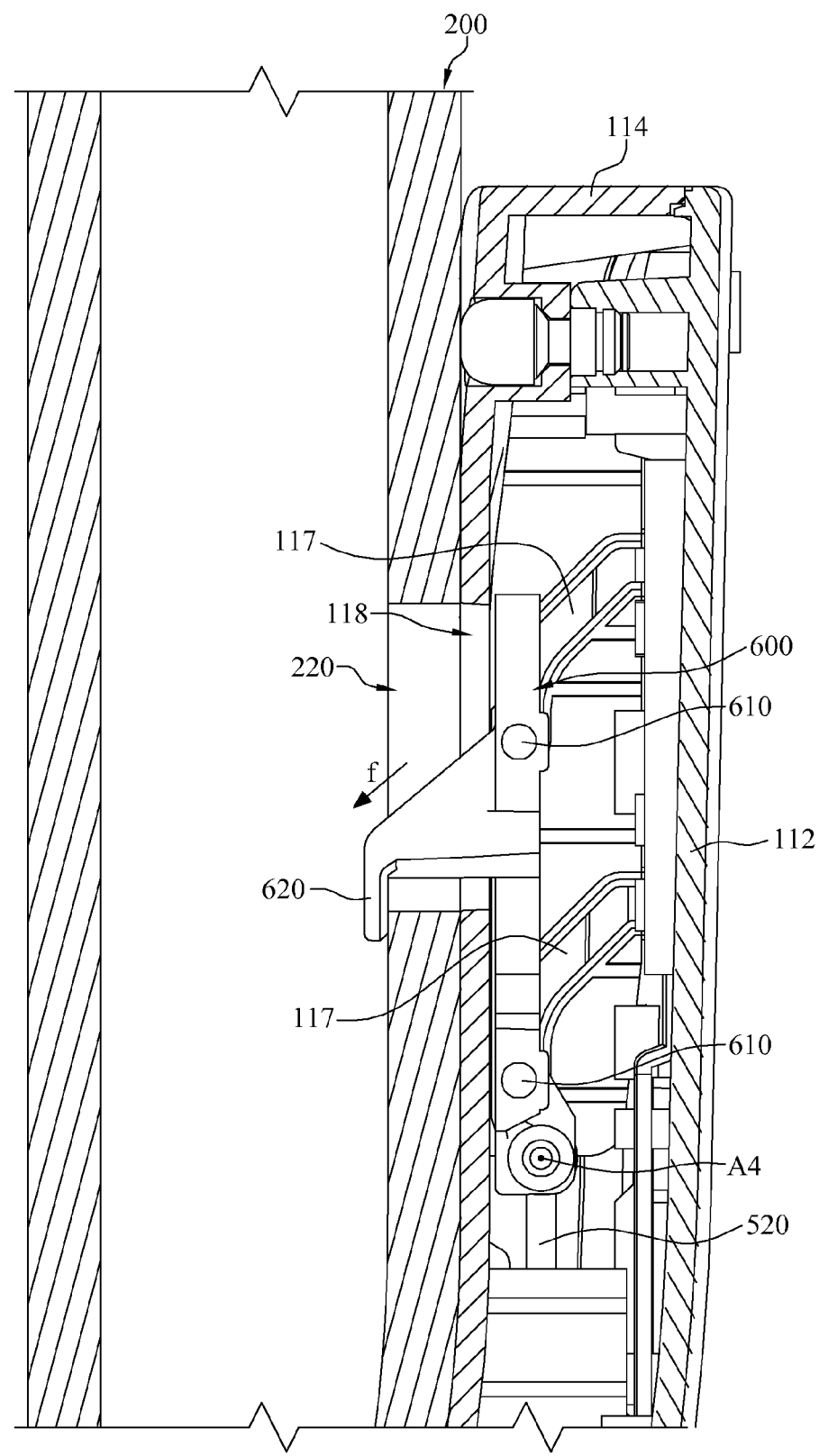
Figure 9A:
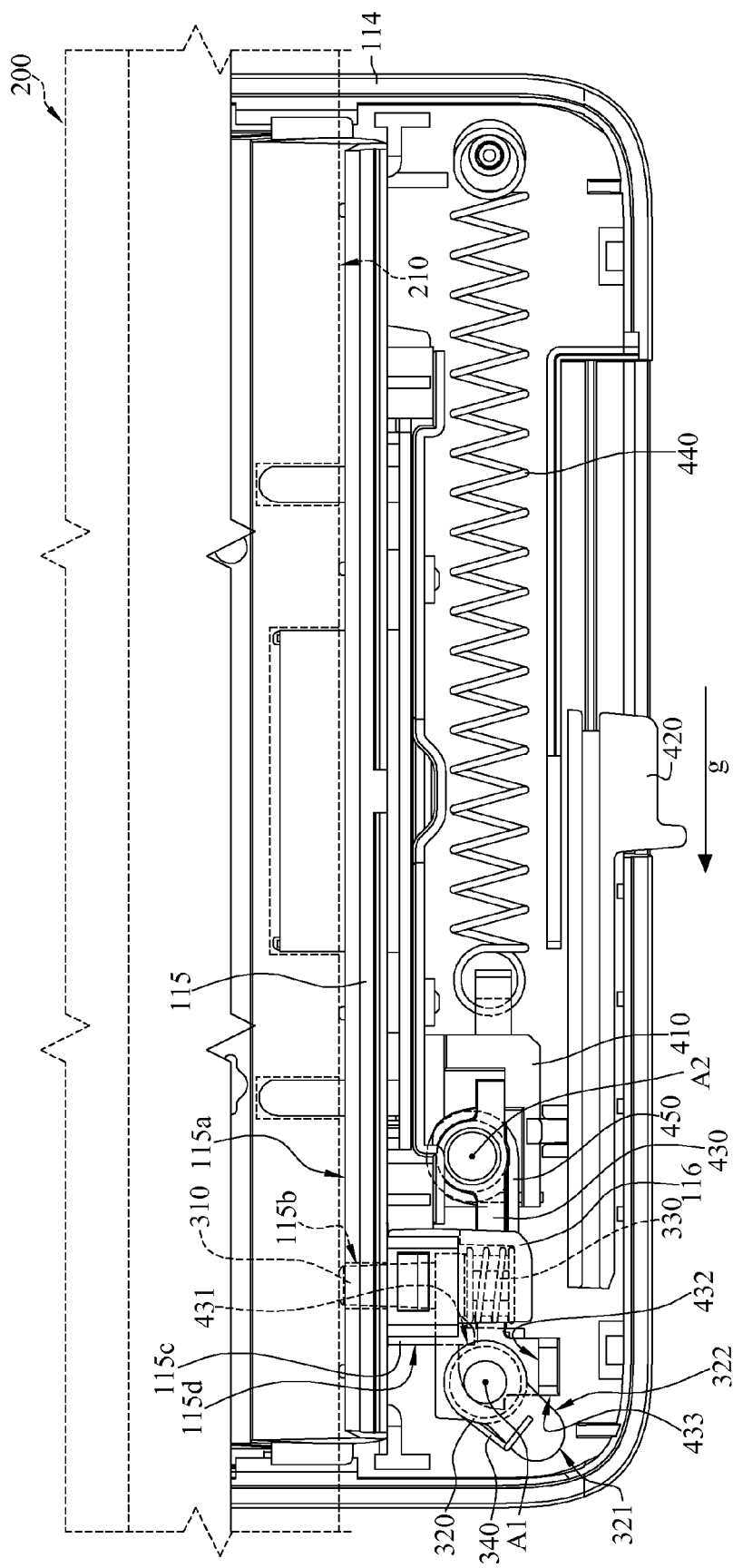
FIG. 9A to FIG. 9C are plan views of the swing member at the room-making position of FIG. 5.
Figure 9B:
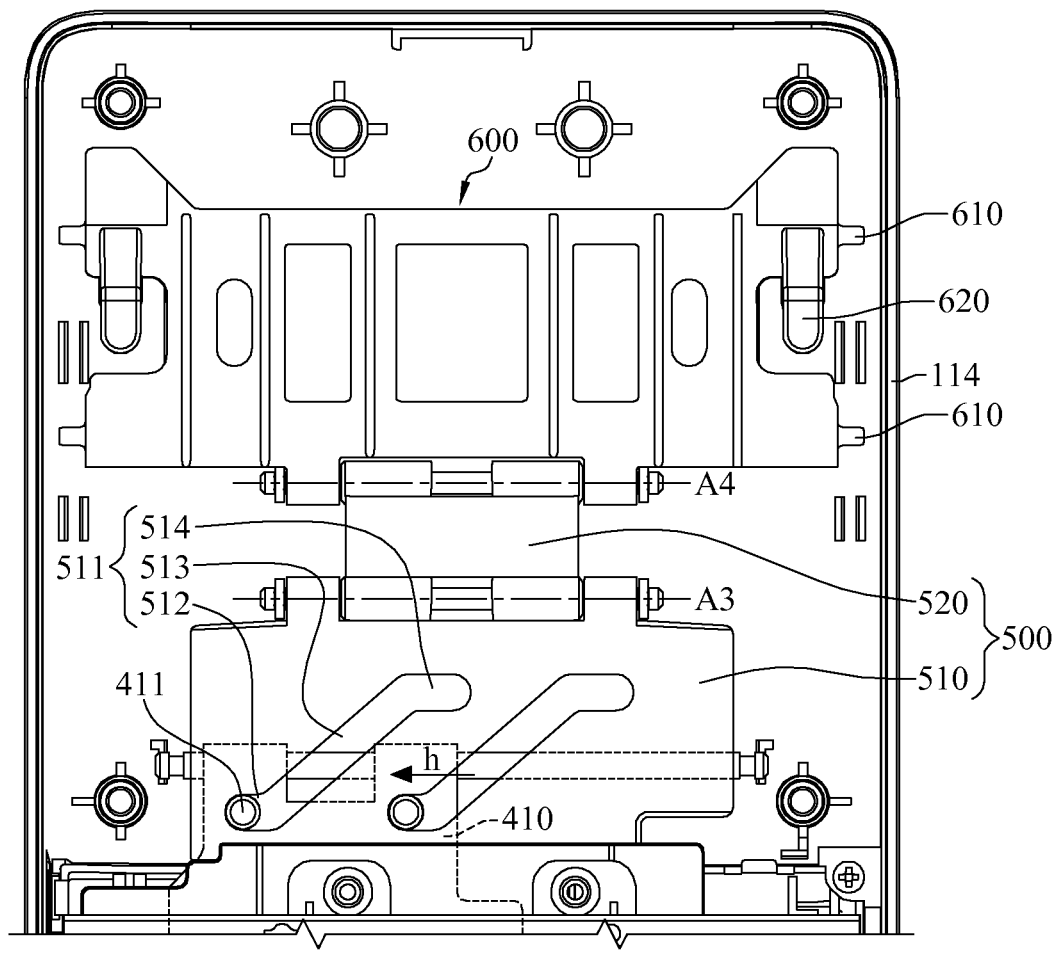
Figure 9C:
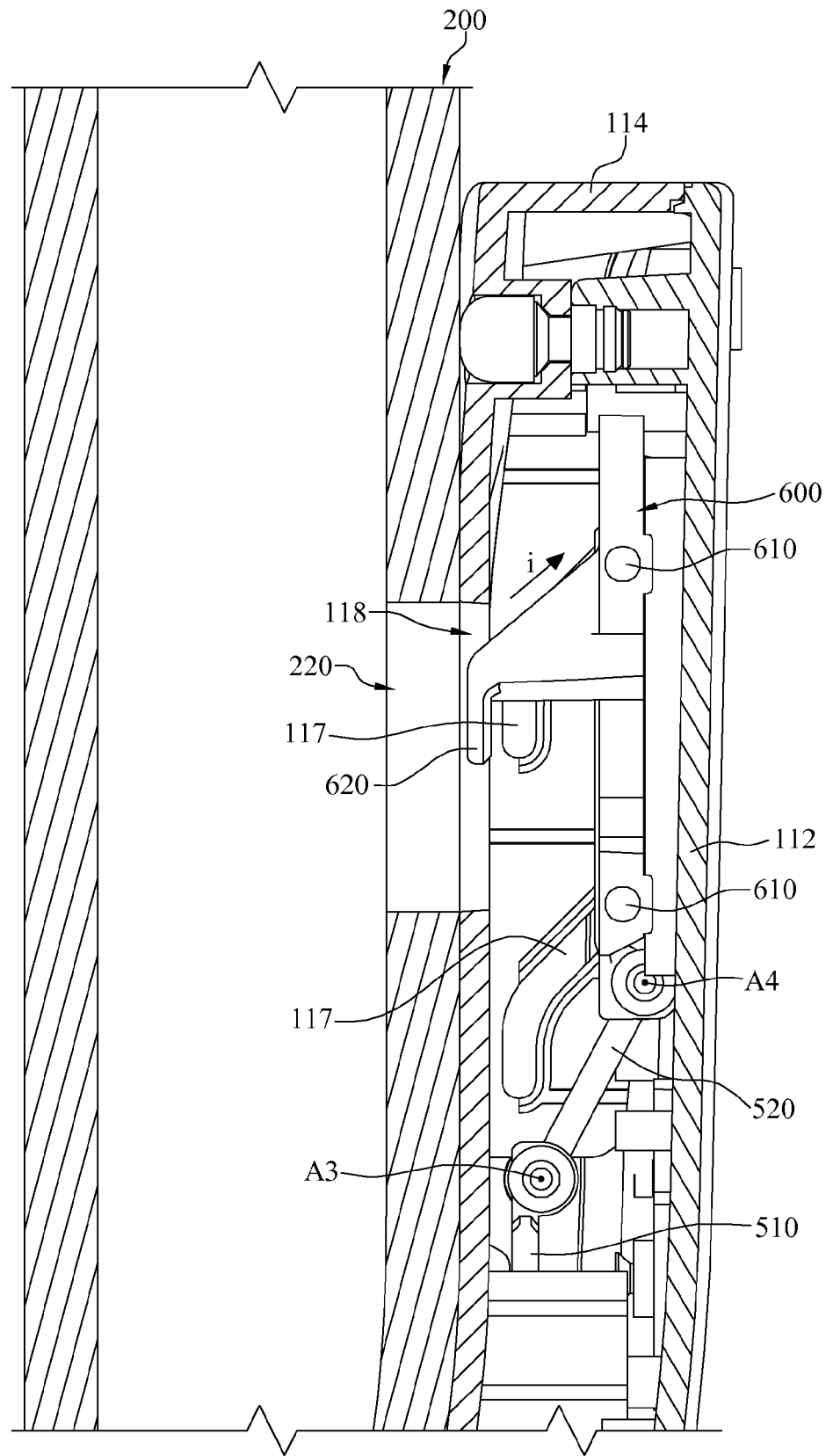
Figure 10:
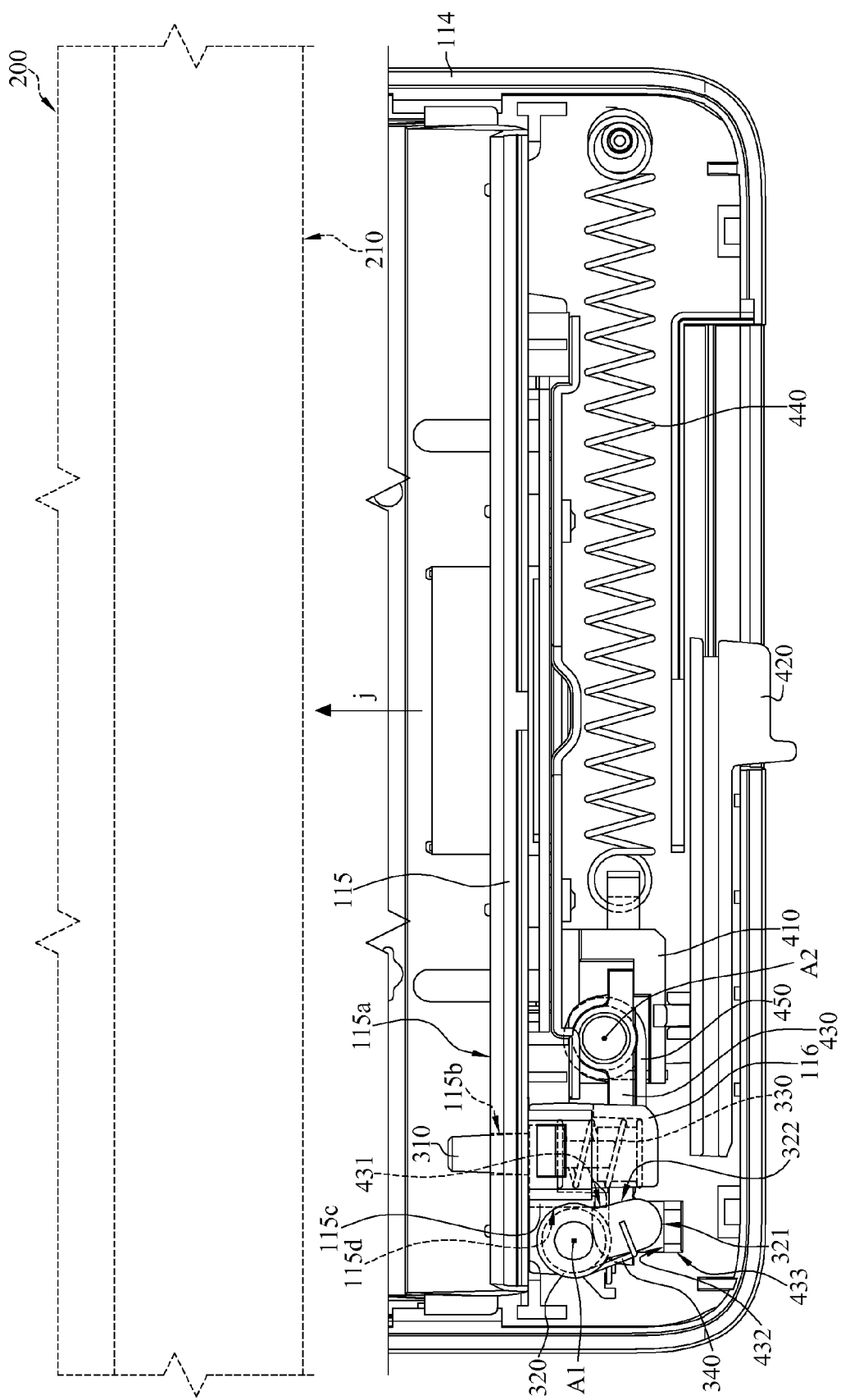
FIG. 10 is a plan view of the combining piece with the electronic device taken out from the base of FIG. 7.

FIG. 6 is a plan view of the trigger member at the untriggered position of FIG. 5; FIG. 7A to FIG. 7C are plan views of the trigger member at the triggered position and the operating mechanism at the first operating position of FIG. 5; FIG. 8A to FIG. 8C are plan views of the trigger member at the triggered position and the operating mechanism at the second operating position of FIG. 5; FIG. 9A to FIG. 9C are plan views of the swing member at the room-making position of FIG. 5; FIG. 10 is a plan view of the combining piece with the electronic device taken out from the base of FIG. 7. As seen in FIG. 6 to FIG. 10, the trigger mechanism 300 comprises a trigger member 310, a swing member 320, a first elastic member 330 and a second elastic member 340. The trigger member 310 and the swing member 320 are adjacent to the limit rib 115c and the trigger member 310 is movably disposed on the carrying portion 115 of the front cover 111 and therefore has a untriggered position (as shown in FIG. 7) and a triggered position (as shown in FIG. 7A and FIG. 8A). In this embodiment, the moving direction of the trigger member 310 is perpendicular to the carrying surface 115a.

In this embodiment, when the trigger member 310 is at the untriggered position, the trigger member 310 passes through the opening 115b and protrudes from the carrying surface 115a. When the bottom surface 210 of the combining piece 200 touches the carrying surface 115a, it then presses the trigger member 310 for completing triggering processes. Please note that the link between the trigger member 310 and other components will be explained at later stage. The trigger member 310, however, may not protrude from the carrying surface 115a. In other embodiments, the bottom surface 210 of the combining piece 200 has a protruding pressing portion and the opening 115b exposes the trigger member 310. When the bottom surface 210 of the combining piece 200 touches the carrying surface 115a, the protruding pressing portion can pass through the opening 115b and press the trigger member 310 for completing triggering process.

The swing member 320 is pivoted on the trigger member 310 and thus has a pressing position (as shown in FIG. 6 and FIG. 7A) and a room-making position (as shown in FIG. 9A). The swing member 320 has a pressing surface 321 and a pushed surface 322. When the swing member 320 is at the pressing position, the pushed surface 322 is at one side of the swing member 320 near the limit rib 115c, and the pressing surface 321 is at one side of the swing member 320 facing away from the carrying surface 115a. Specifically, when the swing member 320 is at the pressed position, the swing member 320 tilts towards the trigger member 310 near the first limit surface 115d, while the extending direction of the swing member 320 and the trigger member 310 together form an acute angle θ. The extending direction of the swing member 320 is defined as a direction from the pivoting point of the swing member 320 and the trigger member 310 to the swing member 320 away from the pivoting point.

In this embodiment, the trigger member 310 further has a limit block 311 abutting on the swing member 320 for limiting the tilt angle of the swing member 320 at the pressed position. The tilt angle of the swing member 320 in this embodiment is about the support base 10 degrees. The design of the limit block 311 or the swing member 320 turning to one side at an angle at the pressed position is for preventing the swing member 320 from rotating to the room-making position unexpectedly which leads to the failure of pressing effects.

In this embodiment, the limit block 311 of the trigger member 310 is used for limiting the tilt angle of the swing member 320, but the disclosure is not limited thereto. In other embodiments, other limiting elements can be used for achieving the same purpose.

When the swing member 320 is at the room-making position, the swing member 320 tilts towards one side of the trigger member 310 away from the first limit surface 115d, so that the maximum distance between the pushed surface 322 and the first limit surface 115d is greater than maximum distance between the push surface 433 to the second limit surface 431.

The first elastic member 330 is, for example, a compression spring. In addition, one end of the first elastic member 330 abuts on the front cover 111 while the other end abuts on the trigger member 310, thereby forcing the trigger member 310 to move to the untriggered position.

The second elastic member 340 is, for example, is a torsion spring. Furthermore, one end of the second elastic member 340 abuts on the trigger member 310 while the other end abuts on the swing member 320, thereby forcing the swing member 320 to pivot to the pressed position.

The operating mechanism 400 is slidably disposed on the cover portion 114 of the front cover 111 and the operating mechanism 400 is for users to operate or is to be triggered by the swing member 320 of the trigger mechanism 300, therefore having a first operating position (as seen in FIG. 7) and a second operating position (as seen in FIG. 8A). The operating mechanism 400 has an operating end 401 and a moving end 402 opposite to each other. The moving end 402 corresponds to the swing member 320 (namely it is at the sliding path of the swing member 320), and it may rotate relative to the operating end 401. Specifically, the operating mechanism 400 comprises a guiding member 410, a push button 420, a pivoting member 430, a third elastic member 440 and a fourth elastic member 450. The guiding member 410 is disposed on the cover portion 114 of the front cover 111 in a slidable way and thus has the first operating position (as seen in FIG. 7) and the second operating position (as seen in FIG. 8A).

In this embodiment, the sliding direction of the guiding member 410 is perpendicular to that of the trigger member 310.

The push button 420 is fixed to the guiding member 410 for sliding relative to the cover portion 114 of the front cover 111 along the guiding member 410. The operating end 401 is located on one end of the push button 420 away from the guiding member 410 for users to operate (by pushing it).

The pivoting member 430 is located below the pivoting member 430 and the limit rib 115c in a slidable manner and is pivoted on the guiding member 410. The pivoting member 430 may rotate relative to the guiding member 410 and therefore has a restricted position (as shown in FIG. 6 and FIG. 8A) and an unrestricted position (as shown in FIG. 7A).

In this embodiment, the swing member 320 pivots around a first pivoting centerline A1 relative to the trigger member 310, while the pivoting member 430 pivots around a second pivoting center line A2 relative to the guiding member 410. Further, the first pivoting centerline A1 is parallel to the second pivoting centerline A2.

The moving end 402 is located on one end of the pivoting member 430 away from the guiding member 410 and the moving end 402 of the pivoting member 430 has a second limit surface 431, a pressed surface 432 and a push surface 433. The push surface 433 faces away from the pivoting member 430 and the pressed surface 432 is below the push surface 433.

The third elastic member 440 is a tension spring, for example. One end of the third elastic member 440 is fixed to the front cover 111 while the other end is fixed to the guiding member 410 for forcing the operating mechanism 400 to move towards the second operating position.

The fourth elastic member 450 is, for example, a torsion spring. One end of the fourth elastic member 450 abuts on the guiding member 410 while the other end abuts on pivoting member 430 for forcing the pivoting member 430 to move to the restricted position.

The link mechanism 500 comprises a driven member 510 and a connecting member 520. The driven member 510 is slidably disposed on the cover portion 114 of the front cover 111 and the sliding direction of the driven member 510 is perpendicular to the sliding direction of the guiding member 410. The driven member 510 has at least one guiding groove 511 having a first locating section 512, a guiding section 513 and a second locating section 514. The first locating section 512 and the second locating section 514 are spaced apart by a distance along the sliding direction of the driven member 510. The guiding member 410 further has at least one guiding block 411 located inside the guiding groove 511 in a slidable manner. Thereby, the driven member 510 is driven to slide relative to the front cover 111.

The connecting member 520 is pivoted on the driven member 510 to move or and rotate relative to the front cover 111.

The fastening mechanism 600 is pivoted on the connecting member 520 and the fastening mechanism 600 has a plurality of sliding blocks 610. Each of the sliding blocks 610 is located in each of the curved sliding grooves 117 in a slidable way so that the fastening mechanism 600 can move and rotate relative to the front cover 111. The fastening mechanism 600 has a plurality of second fastening portions 620. Each of the second fastening portions 620 corresponds to each of the first fastening portions 220. When the guiding block 411 is located at the first locating section 512, the second fastening portions 620 is driven to hide in the installation space 113 and is at a release position (as shown in FIG. 7C and FIG. 9C). When the guiding block 411 is at the second locating section 514, the second fastening portion 620 is driven to pass through the through holes 118 and then is at a fastening position (as shown in FIG. 8C).

In this embodiment, the connecting member 520 may pivot around a first axis A3 relative to the driven member 510 while the fastening mechanism 600 may pivot around a second axis A4 relative to the connecting member 520. The second axis A4 is parallel to the third axis A3 and the driven member 510 is able to drive the fastening mechanism 600 to slide more smoothly via assistance of the connecting member 520.

Referring to FIG. 6 to FIG. 10, the installation process of the electronic device 20 and the support base 10 will be illustrated now.

As seen in FIG. 6, when the combining piece 200 with the electronic device 20 is not placed on the carrying surface 115a of the base 100, the trigger member 310 is forced to be at the untriggered position via elastic force of the first elastic member 330. By the elastic force of the second elastic member 340, the swing member 320 is forced to be at the pressed position so that the pressed surface faces the pressing surface and the pushed surface faces the first limit surface. By the elastic force of the fourth elastic member 450, the pivoting member 430 is forced to be at the restricted position so that the second limit surface 431 abuts on the first limit surface 115d, thereby limiting the operating mechanism 400 to be at the first operating position. When the operating mechanism 400 is at the first operating position, it drives the second fastening portions 620 to be at the least position.

As seen in FIG. 7A to FIG. 7C, the combining piece 200 equipped with the electronic device 20 is installed on the carrying surface 115a of the base 100 such that the bottom surface 210 of the combining piece 200 presses the trigger member 310 for forcing the trigger member 310 to move from the untriggered position to the triggered position (along the direction of arrow a). Moreover, the trigger member 310 accordingly drives the swing member 320 at the pressed position to move to the moving end 402 of the pivoting member 430 so that the pressing surface 321 of the swing member 320 presses the pressed surface 432 of the pivoting member 430, thereby making the pivoting member 430 rotate to the unrestricted position relative to the guiding member 410 (along the direction of arrow b). Hence, the second limit surface 431 is separated from the first limit surface 115d. That is, after the combining piece 200 presses the trigger member 310, the fastening relationship between the pivoting member 430 and the limit rib 115c is released by the swing member 320.

As seen in FIG. 8A to FIG. 8C, after the fastening relationship between the pivoting member 430 and the limit rib 115c is released, the elastic force of the first elastic member 330 make the guiding member 410 move from the first operating position to the second operating position (along the direction of arrow c). When the guiding member 410 moves from the first operating position to the second operating position, the guiding block 411 slides from the first locating section 512 to the second locating section 514 (along the direction of arrow d) to drives the driven member 510 to move downwards (along the direction of arrow e). Then, the second fastening portions 620 is driven to pass through the through holes 118 (along the direction of arrow f) for hooking at the fastening position of the first fastening portions 220, thereby fixing the combining piece 200 with the electronic device 20 to the base 100.

As seen in FIG. 9A to FIG. 9C, when the combining piece 200 needs to be removed, users can return the operating mechanism 400 from the second operating position to the first operating position (along the direction of arrow g) in order to drive the guiding block 411 return from the position of the second locating section 514 to the position of the first locating section 512 (along the direction of arrow h). Furthermore, it drives the second fastening portions 620 to return from the fastening position to the release position (along the direction of arrow i) for users to take the combining piece 200 easily. Since the trigger member 310 is still at the triggered position, the swing member 320 could be blocking the sliding path of the operating mechanism 400 and the operating mechanism 400 could be prevented from moving back to the first operating position. However, the swing member 320 of the disclosure is able to pivot relative to the trigger member 310. Thus, when the operating mechanism 400 moves from the second operating position to the first operating position, the push surface 433 of the pivoting member 430 abuts on the pushed surface 322 of the swing member 320 for driving the swing member 320 to rotate to the room-making position and creating space for the second limit surface 431 to abuts on the first limit surface 115d again. Additionally, the operating mechanism 400 is fixed to the first operating position and ready to be triggered. As a result, even if the trigger member 310 is at the triggered position, the operating mechanism 400 is still capable of returning to the first operating position to drive the second fastening portions 620 move to the release position where it is separated from the first fastening portions 220, again.

As seen in FIG. 10, when the combining piece 200 with the electronic device 20 is removed (along the direction of arrow j), the elastic force of the first elastic member 330 forces the trigger member 310 to return to the untriggered position and the elastic force of the second elastic member 340 makes the swing member 320 return to the pressed position. Thereby, the pressing surface 321 of the swing member 320 returns to the place above the pressed surface 432 of the pivoting member 430 such that the trigger mechanism 300 is ready to be triggered.

In the support base for the electronic of the disclosure, the swing member may pivot relative to the trigger member so the operating mechanism can push the swing member to the room-making position to make room for operating mechanism to return to the first operating position even if the trigger member is at the triggered position. Thereby, the second fastening portion is driven to move back to the release position where it is separated from the first fastening portion.

Additionally, the user only needs to use one hand to adjust the push button to shift from the second operating position to the first operating position. Hence, the user is able to hold the combining piece on one hand while flipping the push button of the operating mechanism for separating the combining piece from the base for the sake of convenience.

What is claimed is:

1. A support base for an electronic device, comprising:
   a base comprising a limit rib;
   a trigger mechanism comprising a trigger member and a swing member, wherein the trigger member is movably disposed on the base and therefore has an untriggered position and a triggered position, and the swing member is pivoted on the trigger member and therefore has a pressed position and a room-making position; and
   an operating mechanism movably disposed on the base and therefore having a first operating position and a second operating position, wherein the operating mechanism has an operating end and a moving end opposite to each other, the moving end corresponds to the swing member and is configured for rotating relative to the operating end, when the operating mechanism is at the first operating position, the moving end of the operating mechanism is hooked at the limit rib, and when the operating mechanism is at the second operating position, the moving end of the operating mechanism releases from the limit rib;
   wherein when the swing member is at the pressed position and the trigger member is moving from the untriggered position to the triggered position, the trigger member drives the swing member to move towards the moving end of the operating mechanism, and the swing member presses the moving end for making the moving end be separated from the limit rib, in order to trigger the operating mechanism moving from the first operating position to the second operating position;
   wherein when the trigger member is at the triggered position and the operating mechanism is moving from the second operating position to the first operating position, the moving end of the operating mechanism pushes the swing member and therefore drives the swing member to rotate relative to the trigger member for making the swing member rotate from the pressed position to the room-making position, in order to make room for the moving end to hook at the limit rib, thereby making the operating mechanism return to the first operating position.

2. The support base for the electronic device according to claim 1, further comprising a combining piece configured for being sleeved on an electronic device, wherein the base comprises a case and a support member, the case comprises a front cover and a back cover, the back cover is detachably installed on the front cover to form a installation space, the front cover has a carrying surface and an opening, the carrying surface is located outside the installation space and carries the combining piece, the opening is located on the carrying surface and connects the installation space, the limit rib is located in the installation space and protrudes from the front cover, the trigger mechanism and the operating mechanism are located in the installation space and the opening exposes the trigger member, the support member is located outside the installation space and protrudes from the back cover.

3. The support base for the electronic device according to claim 2, wherein the trigger member passes through the opening and protrudes from the carrying surface.

4. The support base for the electronic device according to claim 2, wherein the trigger mechanism further comprises a first elastic member and a second elastic member, one end of the first elastic member abuts on the front cover, while the other end abuts on the trigger member for forcing the trigger member to move along the direction towards the untriggered position, one end of the second elastic member abuts on the trigger member while the other end abuts on the trigger member while the other end abuts on the swing member for forcing the swing member pivots towards the pressed position.

5. The support base for the electronic device according to claim 4, wherein the operating mechanism further comprises a guiding member, a push button and a pivoting member, the guiding member is slidably disposed on the front cover, the push button is fixed to the guiding member, the operating end is located on one end of the push button away from the guiding member, the pivoting member is pivoted on the guiding member, the moving end is located on one end of the pivoting member away from the guiding member, and the pivoting member is configured for pivoting relative to the guiding member and therefore has a restricted position and a unrestricted position.

6. The support base for the electronic device according to claim 5, wherein the limit rib has a first limit surface, the trigger member and the swing member are adjacent to the limit rib, the swing member has a pressing surface and a pushed surface, the pivoting member is located below the swing member and the limit rib in a slidable manner, the moving end of the pivoting member has a second limit surface, a pressed surface and a push surface, the push surface faces away from the second limit surface while the pressed surface is located below the push surface, when the triggering mechanism is at the untriggered position, the swing member is at the pressed position, the operating mechanism is at the first operating position, and when the pivoting member is at the restricted position, the second limit surface abuts on the first limit surface, the pressed surface faces the pressing surface, the pushed surface faces the first limit surface, when the trigger mechanism is at the triggered position, the swing member is at the pressed position, the operating mechanism is located at the first operating position, and when the pivoting member is at the unrestricted position, the second limit surface is separated from the first limit surface, the pressed surface presses the pressed surface, when the triggering mechanism is at the triggered position, the swing member is at the pressed position, the operating mechanism is at the second operating position, and when the pivoting member is at the restricted position, the push surface faces the pushed surface.

7. The support base for the electronic device according to claim 6, wherein when the swing member is at the pressed position, the swing member extends from the trigger member towards the pivoting member, and the extending direction of the swing member and the sliding direction of the trigger member together form an acute angle.

8. The support base for the electronic device according to claim 7, wherein the distance between the pushed surface and the first limit surface when at the room-making position is greater than the distance between the pushed surface and the first limit surface when at the pressed position.

9. The support base for the electronic device according to claim 8, wherein when the swing member is at the room-making position, the maximum distance between the pushed surface and the first limit surface is greater than the maximum distance between the pushed surface and the second limit surface.

10. The support base for the electronic device according to claim 7, wherein the trigger member further has a limit block, and when the swing member is at the pressed position, the swing member abuts on the limit block for limiting the tilt angle of the swing member.

11. The support base for the electronic device according to claim 5, wherein the operating mechanism further comprises a third elastic member and a fourth elastic member, one end of the third elastic member abuts on the front cover while the other end abuts on the guiding member for forcing the operating mechanism to move towards the second operating position, and one end of the fourth elastic member abuts on the guiding member while the other end abuts on the pivoting member for forcing the pivoting member to move towards the restricted position.

12. The support base for the electronic device according to claim 5, wherein the sliding direction of the guiding member is perpendicular to the sliding direction of the trigger member.

13. The support base for the electronic device according to claim 5, wherein the swing member pivots around a first pivoting centerline relative to the trigger member, the pivoting member pivots around a second pivoting centerline relative to the guiding member, and the first pivoting centerline is parallel to the second pivoting centerline.

14. The support base for the electronic device according to claim 2, further comprising a link mechanism and a fastening mechanism, wherein the link mechanism comprises a driven member and a connecting member, the driven member is slidably disposed on the front cover, the driven member has at least on guide groove, the guide groove has a first locating section, a guide section and a second locating section, the first locating section and the second locating section which are along the sliding direction of the driven member are separated apart by a distance, the fastening mechanism is slidably disposed on the front cover and is pivoted on the connecting member, the combining piece has a first fastening portion, the fastening mechanism has a second fastening portion corresponding to the first fastening portion, the guiding member has at least one guiding block located in the guide groove in a slidable manner, when the combining piece is at the carrying surface of the front cover and the operating mechanism is at the first operating position, the guiding block is at the first locating section for driving the first fastening portion to be separated from the second fastening portion, in order to locate the fastening mechanism at a release position, and when the combining piece is at the carrying surface of the front cover and the operating mechanism is at the second operating position, the guiding block is at the second locating section for driving the second fastening portion to hook at the first fastening portion, in order to locate the fastening mechanism at a fastening position.

15. The support base for the electronic device according to claim 14, wherein the front cover has two curved sliding grooves located in the installation space, the fastening mechanism has two sliding blocks, the two sliding blocks are located on the two curved sliding grooves in a slidable way for enabling the fastening mechanism to move relative to the front cover.

16. The support base for the electronic device according to claim 14, wherein the connecting member is configured for pivoting around a first axis, relative to the driven member, while the fastening mechanism is configured for pivoting around a second axis, relative to the connecting member, and the second axis is parallel to the first axis.

\* \* \* \* \*